US00RE50299E

(19) United States
(12) Reissued Patent
Kim et al.

(10) Patent Number: US RE50,299 E
(45) Date of Reissued Patent: *Feb. 11, 2025

(54) POWER HEADROOM REPORT METHOD AND APPARATUS FOR MOBILE COMMUNICATION SYSTEM SUPPORTING CARRIER AGGREGATION

(71) Applicant: Samsung Electronics Co., Ltd., Suwon-si (KR)

(72) Inventors: Soeng Hun Kim, Suwon-si (KR); Kyeong In Jeong, Hwaseong-si (KR); Sang Bum Kim, Seoul (KR); Gert-Jan Van Lieshout, Middlesex (GB)

(73) Assignee: Samsung Electronics Co., Ltd., Suwon-si (KR)

( * ) Notice: This patent is subject to a terminal disclaimer.

(21) Appl. No.: 16/934,675

(22) Filed: Jul. 21, 2020

Related U.S. Patent Documents

Reissue of:
(64) Patent No.: 9,480,030
Issued: Oct. 25, 2016
Appl. No.: 14/850,437
Filed: Sep. 10, 2015

U.S. Applications:
(63) Continuation of application No. 16/169,706, filed on Oct. 24, 2018, now Pat. No. Re. 50,162, which is an
(Continued)

(30) Foreign Application Priority Data

Nov. 2, 2011 (KR) ..... 10-2011-0113229

(51) Int. Cl.
*H04W 72/21* (2023.01)
*H04W 24/10* (2009.01)
(Continued)

(52) U.S. Cl.
CPC ..... *H04W 52/365* (2013.01); *H04W 24/10* (2013.01); *H04W 52/242* (2013.01);
(Continued)

(58) Field of Classification Search
CPC . H04W 52/365; H04W 24/10; H04W 52/242; H04W 72/0473; H04W 72/20; H04W 72/21
See application file for complete search history.

(56) References Cited

U.S. PATENT DOCUMENTS 7,697,954 B2 4/2010 Kwak et al.
8,107,991 B2 1/2012 Pelletier et al.
(Continued)

FOREIGN PATENT DOCUMENTS

CN 101147339 A 3/2008
CN 101340711 A 1/2009
(Continued)

OTHER PUBLICATIONS

U.S. Non-Final Office Action dated Apr. 16, 2021, issued in U.S. Appl. No. 16/169,706.
(Continued)

*Primary Examiner* — Mark Sager
(74) *Attorney, Agent, or Firm* — Jefferson IP Law, LLP

(57) ABSTRACT

A method and user equipment (UE) for obtaining power headroom information in a communication system are provided. The method includes acquiring information for a path loss reference, wherein the information for the path loss reference indicates whether the UE applies as the path loss reference either a downlink of a primary cell or a downlink of a secondary cell (SCell), triggering a power headroom report (PHR) if a prohibitPHR-Timer expires and a path loss is changed more than a threshold for at least one activated cell which is used as the path loss reference, and obtaining
(Continued)

power headroom information for each activated cell, if extended PHR is used and an uplink resource is allocated for new transmission.

16 Claims, 8 Drawing Sheets

Related U.S. Application Data application for the reissue of Pat. No. 9,480,030, which is a continuation of application No. 13/289,602, filed on Nov. 4, 2011, now Pat. No. 9,185,665.

(60) Provisional application No. 61/410,493, filed on Nov. 5, 2010.

(51) Int. Cl.
*H04W 52/24* (2009.01)
*H04W 52/36* (2009.01)
*H04W 72/044* (2023.01)
*H04W 72/20* (2023.01)

(52) U.S. Cl.
CPC ..... *H04W 72/0473* (2013.01); *H04W 72/20* (2023.01); *H04W 72/21* (2023.01)

(56) References Cited

U.S. PATENT DOCUMENTS 8,249,091 B2 8/2012 Kim et al.
8,295,779 B2 10/2012 Cave et al.
8,315,661 B2 11/2012 Zong
8,422,387 B2 * 4/2013 Hsu ..... H04W 74/02 370/252
8,594,718 B2 * 11/2013 Yang ..... H04W 52/365 455/115.1
8,605,614 B2 12/2013 Nishio et al.
8,811,322 B2 8/2014 Feuersanger et al.
8,954,107 B2 2/2015 Kim et al.
9,014,031 B2 * 4/2015 Suzuki ..... H04W 52/365 370/252
9,144,038 B2 9/2015 Kim et al.
9,185,665 B2 * 11/2015 Kim ..... H04W 52/365
9,386,470 B2 7/2016 Baldemair et al.
2008/0025254 A1 1/2008 Love et al.
2009/0253533 A1 10/2009 Hirano
2009/0318180 A1 * 12/2009 Yi ..... H04W 52/365 455/522
2010/0158147 A1 6/2010 Zhang et al.
2010/0232385 A1 9/2010 Hsu
2010/0238863 A1 * 9/2010 Guo ..... H04L 5/0046 370/328
2010/0273515 A1 * 10/2010 Fabien ..... H04L 5/006 455/509
2010/0297993 A1 11/2010 Heo et al.
2011/0038271 A1 2/2011 Shin et al.
2011/0080838 A1 4/2011 Larsson et al.
2011/0092217 A1 * 4/2011 Kim ..... H04W 52/367 455/450
2011/0159912 A1 * 6/2011 Zong ..... H04W 52/16 455/522
2011/0242972 A1 10/2011 Sebire et al.
2011/0249584 A1 10/2011 Barbieri et al.
2011/0261714 A1 10/2011 Pan et al.
2011/0292874 A1 12/2011 Ho et al.
2012/0008552 A1 1/2012 Baldemair et al.
2012/0040707 A1 2/2012 Kim et al.
2012/0040708 A1 2/2012 Jeong et al.
2012/0044882 A1 * 2/2012 Kim ..... H04L 5/00 370/329
2012/0076023 A1 3/2012 Ko et al.
2012/0083308 A1 4/2012 Wang et al.
2012/0087317 A1 4/2012 Bostroem et al.
2012/0093020 A1 4/2012 Iwai et al.
2012/0113818 A1 5/2012 Kim et al.
2012/0113845 A1 5/2012 Kim et al.
2012/0224535 A1 9/2012 Kim et al.
2012/0263060 A1 10/2012 Suzuki et al.
2012/0281568 A1 11/2012 Ho et al.
2012/0294167 A1 11/2012 Zhu et al.
2013/0028223 A1 * 1/2013 Kim ..... H04L 5/0007 370/329
2013/0039202 A1 2/2013 Feuersanger et al.
2013/0051259 A1 2/2013 Kim et al.
2013/0064131 A1 3/2013 Kwon et al.
2013/0114578 A1 5/2013 Lim et al.
2013/0114579 A1 5/2013 Vujcic
2013/0182674 A1 7/2013 Lunttila et al.
2013/0188570 A1 7/2013 Zhao et al.
2014/0023010 A1 1/2014 Loehr et al.
2014/0349701 A1 * 11/2014 Vajapeyam ..... H04W 52/32 455/522
2015/0131567 A1 5/2015 Fu et al.
2015/0173030 A1 * 6/2015 Kim ..... H04W 52/365 455/522
2015/0195795 A1 7/2015 Loehr et al.
2015/0327187 A1 * 11/2015 Lu ..... H04W 52/365 370/329
2015/0382310 A1 12/2015 Kim et al.
2015/0382311 A1 * 12/2015 Kim ..... H04W 52/365 370/329
2015/0382312 A1 12/2015 Kim et al.
2015/0382313 A1 * 12/2015 Kim ..... H04W 52/365 370/252
2016/0057711 A1 * 2/2016 Chen ..... H04W 52/365 370/329

FOREIGN PATENT DOCUMENTS

CN 101442813 A 5/2009
CN 101711054 A 5/2010
CN 101715207 A 5/2010
CN 201499310 U 6/2010
CN 101778416 A 7/2010
CN 101808360 A 8/2010
CN 101841844 A 9/2010
CN 101848487 A 9/2010
CN 101925105 A 12/2010
CN 102104905 A 6/2011
CN 102204203 A 9/2011
EP 2 317 816 A1 5/2011
EP 2 536 198 A1 12/2012
JP 2009-247497 A 10/2009
JP 2011-097224 A 5/2011
JP 2012-517747 A 8/2012
WO 2010/008859 A1 1/2010
WO 2010/065759 A2 6/2010
WO 2010/091425 A2 8/2010
WO 2011/139200 A1 11/2011
WO 2012/056273 A1 5/2012

OTHER PUBLICATIONS

European Search Report dated Feb. 13, 2023, issued in European Application No. 22206630.0.

Chinese Office Action dated Dec. 23, 2020, issued in Chinese Patent Application No. 201910879862.9.

Mediatek, "MAC CE for SCell activation deactivation", 3GPP Draft, R2-105443_DIS MAC CE for SCell Activation Deactivation, 3rd Generation Partnership Project (3GPP), Mobile Competence Centre, 650, Route Des Lucioles, F-06921 Sophia-Antipolis Cedex, France, vol. RAN WG2, Xi'an, China, 20101011-20101015, XP050452601, Oct. 5, 2010.

European Office Action dated Jun. 21, 2021, issued in European Patent Application No. 20185755.4.

Panasonic, "Influence of UE power back-off to system performance for clustered PUSCH transmission", 3GPP TSG-RAN WG 1 Meeting #60bis, R1-102033, Apr. 16, 2010.

(56) References Cited

OTHER PUBLICATIONS

Chinese Notice of Allowance dated Nov. 2, 2021, issued in Chinese Patent Application No. 201710318461.7.
Samsung, PH calculation of non-transmitting CC [online], 3GPP TSG-RAN WG2 # 71bis, 3GPP, 2010.10.5, R2-105403, search date [Jul. 5, 2018], internet <URL: http://www.3gpp.org/ftp/tsg_ran/WG2_RL2/TSGR2_71bis/Docs/R2-105403.zip>.
New Postcom, PHR MAC CE format design and analysis of relevant issues [online], 3GPP TSG-RAN WG2 # 71bis, 3GPP, 2010.10.1, R2-105411, search date [Jul. 5, 2018], internet <URL: http://www.3gpp.org/ftp/tsg_ran/WG2_RL2/TSGR2_71bis/Docs/R2-105411.zip>.
Nokia Siemens Networks et al: "Details of PHR for carrier aggregation", 3GPP Draft; R2-103558 Details of PHR for Carrier Aggregation, 3rd Generation Partnership Project (3GPP), Mobile Competence Centre ; 650, Route Des Lucioles; F-06921 Sophia-Antipolis Cedex ; France, vol. RAN WG2, no. Stockholm, Sweden; 20100628-20100702, Jun. 22, 2010 (Jun. 22, 2010), XP050605217, [retrieved on Jun. 22, 2010].
Itri: 'PHR format for Ca', 3GPP Draft; R2-105818 Phr Format for CA V3, 3rd Generation—Partnership Project (3GPP), Mobile Compentence Centre, 650, Route Des Lucioles, F-06921 Sophia-Antipolis Cedex, France, vol. RAN WG2, no. Xi 'an, China, XP050605452.
Alcatel-Lucent et al: "MAC PHR CE format design for LTE-A CA scenario", 3GPP Draft; R2-105651, 3rd Generation Partnership Project (3GPP), Mobile8 Competence Centre, 650, Route Des Lucioles ; F-06921 Sophia-Antipolis Cedex; France, vol. RAN WG2, no. Xi 'an; XP050452549.
Panasonc, "UE-specific Power headroom report" 3GPP Draft, R2-103602, 3rd Generation Partnership Project (3GPP), Mobile Competence Centre, 650, XP050451149, Jun. 22, 2010.
Research in Motion et al., "Discussion on Per UE PHR", 3GPP Draft, R1-104917 (RIM-PERUEPHR), 3rd Generation Partnership Project (3GPP) Mobile Competence Centre, 650, XP050440063, Aug. 17, 2010.
ZTE, "Parallel transmission of two types PHR", 3GPP Draft, R2-103725, Parallel Transmission OT Type 1, 2 PHR, 3rd Generation Partnership Project (3GPP), Mobile Competence Centre, 650, Xp050451200, Jun. 22, 2010.
Nokia Siemens Networks, et al., "Further consideration on virtual PHR", 3GPP Draft, R2-104394, Further Consideration on Virtual PHR, Mobile Competence Centre, 650, XP050451845, Aug. 17, 2010.
Nokia, "On LTE CA UE SEM, ACLR and MPR", 3GPP Draft, R4-101761, 3rd Generation Partnership Project (3GPP), Mobile Competence Centre, 650, XP050426749, May 20, 2010.
LG Electronics Inc., "PHR Format for CA", 3GPP Draft, R2-103937, PHR Format for CA, 3rd Generation Partnership Project (3GPP), Mobile Competence Centre, 650 Route Des Lucioles, F-06921 Sophia-Antipolis Cedex, France, vol. RAN WG2, no Stockholm, Sweden 20100628-20100702, XP050605240, Jun. 22, 2010.
3GPP, "3rd Generation Partnership Project, Technical Specification Group Radio Access Network, Evolved Universal Terrestrial Radio Access Network (E-UTRA), Medium Access Control (MAC) protocol specification (Release 9)", 3GPP TS 36.321 V9.3.0, XP050441909 Jun. 2010.
Gerstenberger, Dirk, LS on the reference format on virtual PHR', Dirk Gerstenberger 3GPP TSG-RAN WG1 #62bis, R1-105820.
HTC, "Power Headroom Reporting", 3GPP TSG-RAN WG1, #61, R1-102732, May 14, 2010.
MediaTek, "Per UE PHR for carrier aggregation", 3GPP TSG-RAN WG1 Meeting #61bis, R1-103743, Jul. 2, 2010.
Ericsson, "Summary of e-mail discussion [71#57] LTE CA, PHR Reporting", 3GPP Draft, R2-105462, Summary of E-mail Discussion 71#57 PHR Reporting, 3rd Generation Partnership Project (3GPP) XP050605439, Oct. 5, 2010.
Alcatel-Lucent et al., "Discussion on PHR remaining issues", 3GPP Draft R2-105648, 3rd Generation Partnership Project (3GPP), XP050452546, Oct. 4, 2010.
Itri, "Consideration on the Remaining Issues of PHR", 3GPP Draft, R2-104893, Considerations on the Remaining Issues of PHR V2, 3rd Generation Partnership Project (3GPP), XP050452011, Aug. 17, 2010.
Chinese Office Action dated Feb. 26, 2019, issued in Chinese Patent Application No. 201610579924.0.
Chinese Office Action dated Mar. 20, 2019, issued in Chinese Patent Application No. 201510818852.6.
Chinese Office Action dated Mar. 30, 2018, Issued in Chinese Patent Application No. 201510818852.6.
European Search Report dated Jan. 30, 2019, issued in European Patent Application No. 18210171.7.
European Office Action dated Feb. 15, 2019, issued in European Patent Application No. 11816592.7.
European Search Report dated Apr. 2, 2019, issued in European Patent Application No. 19162201.8.
European Office Action dated Apr. 10, 2019, issued in European Patent Application No. 18198779.3.
Nokia Siemens Networks et al., R2-105379, "PHR remaining issues", 3GPP TSG RAN WG2 #71bis, Xian, China Oct. 11-15, 2010.
Alcatel-Lucent et al., R2-105649, "PHR triggers and timer handling", 3GPP TSG RAN WG2 #71bis, Xian, China, Oct. 11-15, 2010.
Ericsson, ST-Ericsson, "Pcmax for carrier aggregation and how to test it[online]", 3GPP TSG-RAN WG4#58AH,3GPP, R4-112186, Shanghai, China, Apr. 11-15, 2011.
New Postcom, "Unification of Extended PHR MAC CE formats[online]", 3GPP TSG-RAN WG2#73,3GPP, R2-111723, Taipai, Taiwan, Feb. 21-25, 2011.
3rd Generation Partnership Project; Technical Specification Group Radio Access Network; Evolved Universal Terrestrial Radio Access (E-UTRA); Physical layer procedures (Release 10), 3GPP TS 36.213 V10.2.0, Jun. 2011.
Korean Office Action dated May 2, 2019, issued in Korean Patent Application No. 10-2019-0022041.
European Search Report dated May 20, 2019, issued in European Patent Application No. 19171087.0.
Japanese Office Action dated May 24, 2019, issued in Japanese Patent Application No. 2017-106861.
Huawei, The possible impact of UL SU-MIMO on PH mapping [online], 3GPP TSG-RAN WG4#56, R4-103044, Aug. 23-27, 2010, Madrid, Spain.
Panasonic, Open issues for power headroom reporting [online], 3GPP TSG-RAN WG2#71bis, R2-105757, Oct. 11-15, 2010, Xi'an, China.
Japanese Office Action dated Dec. 16, 2019, issued in Japanese Patent Application No. 2019-005222.
US Office Action dated May 3, 2023, issued in U.S. Appl. No. 16/169,706.
US Office Action dated Feb. 12, 2024, issued in U.S. Appl. No. 16/169,706.
European Office Action dated Dec. 14, 2023, issued in European Application No. 22 206 630.0.
US Office Action dated Aug. 29, 2023, issued in U.S. Appl. No. 16/169,706.
US Notice of Allowance dated Aug. 9, 2024, issued in U.S. Appl. No. 16/169,706.
ZTE, Discussion on PHR report[online], 3GPP TSG-RAN WG2#71bis R2-105345, <URL:http://www.3gpp.org/ftp/sg_ran/WG2_RL2/TSGR2_71bis/Docs/R2-105345.zip>, Oct. 15, 2010.
Nokia Siemens Networks et al: "Details of PHR for carrier aggregation", 3GPP Draft; R2-103558 Details of PHR for Carrier Aggregation, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628-20100702, Jun. 22, 2010.
"LS on power headroom reporting for carrier aggregation", 3GPP TSG RAN WG1 Meeting #61 R1-103405 Montreal, Canada, May 10-14, 2010.
"PUSCH/PUCCH power headroom reporting", 3GPP TSG RAN WG1 Meeting #61 R1-103007 Montreal, Canada, May 10-14, 2010.

(56) References Cited

OTHER PUBLICATIONS

3GPP, '3rd Generation Partnership Project; Technical Specification Group Radio Access Network; Evolved Universal Terrestrial Radio Access (E-UTRA); Medium Access Control (Th~C) protocol specification (Release 9),' 3GPP TS 36.321 V9.3.0, Jun. 2010. (Retrieved from the Internet on Apr. 24, 2012: < URL: http://\~v.3gpp.org/ftp/Specs/html-info/36321.htm>).

HTC, 'Power Headroom Reporting,' 3GPP TSG-RAN WG1 #61, R1-102732, May 10-14, 2010. (Retrieved from the Internet on 24 Apr. 1, 2012: < URL: http://\vww.3gpp.org/ftp/ts~ran/WG1_RL1/TSGR1_61/Docs>).

Mediatek, 'Per UE PHR for carrier aggregation,' 3GPP TSG-RAN WG1 Meeting #61bis, R1-103743, Jun. 28-Jul. 2, 2010. (Retrieved from the Internet on 24 Apr. 1, 2012: < URL: http://www.3gpp.org/ftp/tsgjan/wgLrll/tsgrL61b/docs>).

ZTE, Considerations on scheduling in carrier aggregation[online], 3GPP TSG-RAN WG2 # 66bis R2-093886, <URL: http://www.3gpp.org/ftp/tsg_ran/WG2_RL2/TSGR2_66bis/Docs/R2093886.zip>, Jul. 3, 2009.

RAN WG2, LS on RAN2 CA decisions related to AN1[online], 3GPP TSG-RAN WG4#57, R4-104037, internet <URL: http://www.3gpp.org/ftp/tsg_ran/WG4_Radio/TSG, R4_57/Docs/R4-104037.zip>, Nov. 4, 2011.

* cited by examiner

POWER HEADROOM REPORT METHOD AND APPARATUS FOR MOBILE COMMUNICATION SYSTEM SUPPORTING CARRIER AGGREGATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This application is a continuation reissue application of U.S. patent application Ser. No. 16/169,706, which is an application for reissue of U.S. Pat. No. 9,480,030 issued on Oct. 25, 2016.*

*More than one reissue has been filed for this patent: This is a continuation reissue of U.S. application Ser. No. 16/169,706, which was filed on Oct. 24, 2018, which is a reissue of U.S. Pat. No. 9,480,030.*

[This] *U.S. Pat. No. 9,480,030* is a continuation application of prior U.S. patent application assigned Ser. No. 13/289,602 filed Nov. 4, 2011, which issued as U.S. Pat. No. 9,144,039 on Sep. 22, 2015; which claims the benefit under 35 U.S.C. §119(e) of a U.S. provisional patent application filed on Nov. 5, 2010 in the United States Patent and Trademark Office and assigned Ser. No. 61/410,493, and under 35 U.S.C. §119(a) of a Korean patent application filed on Nov. 2, 2011 in the Korean Intellectual Property Office and assigned Serial No. 10-2011-0113229, the entire disclosures of which are hereby incorporated by reference.

BACKGROUND OF THE INVENTION

1. Field of the Invention

The present invention relates to a method and apparatus for a mobile communication system. More particularly, the present invention relates to an improved power headroom report method and apparatus for a mobile communication system supporting carrier aggregation.

2. Description of the Related Art

Mobile communication systems have been developed to provide subscribers with voice communication services on the move. With the advancements of various technologies, the mobile communication systems have evolved to support high speed data communication services as well as the voice communication services.

Recently, as a next generation mobile communication system of the 3$^{rd}$ Generation Partnership Project (3GPP), Long Term Evolution (LTE) is under development. The LTE system is a technology for realizing high-speed packet-based communication at about 100 Mbps. Regarding the commercialization of the LTE system, a discussion is being held on several schemes, namely one scheme for reducing the number of nodes located in a communication path by simplifying a configuration of the network, and another scheme for maximally approximating wireless protocols to wireless channels.

Unlike voice communication service, data communication service is characterized in that the resource is allocated according to the amount of data to be transmitted and channel conditions. Accordingly, in the wireless communication system, such as cellular communication system, a scheduler manages resource allocation in consideration of the amount of resources, channel conditions, and amount of data. It is also the case in the LTE system that the scheduler, which is located in the base station, manages and allocates the radio resources.

Recently, LTE-Advanced (LTE-A) is actively being discussed as an evolution of the LTE with new techniques to increase the data rate. Carrier Aggregation (CA) is one of the representative techniques that are newly adopted in LTE-A. Unlike data communication of the related art in which a User Equipment (UE) uses a single uplink carrier and a single downlink carrier, the carrier aggregation enables the UE to use multiple uplink and/or downlink carriers. Since the uplink transmission power determination algorithm of the related art is designed for the UE operating with one uplink carrier and one downlink carrier, it is difficult to apply the transmission power determination process of the related art for uplink transmission power determination of the UE supporting carrier aggregation. In particular, there is a need to define a procedure and method for reporting Power Headroom (PH) of the UE supporting carrier aggregation.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting and receiving Power Headroom (PH) information for multiple carriers efficiently in a mobile communication system supporting carrier aggregation.

It is another object of the present invention to provide a method and apparatus for triggering a PH Report (PHR) more efficiently in a mobile communication system supporting carrier aggregation.

In accordance with an aspect of the present invention, a method for obtaining, by a user equipment (UE), power headroom information in a communication system is provided. The method includes acquiring information for a path loss reference, wherein the information for the path loss reference indicates whether the UE applies as the path loss reference either a downlink of a primary cell or a downlink of a secondary cell (SCell), triggering a power headroom report (PHR) if a prohibitPHR-Timer expires and a path loss is changed more than a threshold for at least one activated cell which is used as the path loss reference, and obtaining power headroom information for each activated cell, if extended PHR is used and an uplink resource is allocated for new transmission.

In accordance with another aspect of the present invention, a user equipment (UE) for obtaining power headroom information in a communication system is provided. The UE includes a transceiver configured to transmit and receive a signal, and a controller. The controller is configured to acquire information for a path loss reference, wherein the information for the path loss reference indicates whether the UE applies as the path loss reference either a downlink of a primary cell or a downlink of a secondary cell (SCell), trigger a power headroom report (PHR) if a prohibitPHR-Timer expires and a path loss is changed more than a threshold for at least one activated cell which is used as the path loss reference, and obtain power headroom information for each activated cell, if extended PHR is used and an uplink resource is allocated for new transmission.

In accordance with another aspect of the present invention, a method for receiving power headroom information by a base station in a communication system is provided. The method includes transmitting information for a path loss reference to a user equipment (UE), wherein the information for the path loss reference indicates whether the UE applies as the path loss reference either a downlink of a primary cell or a downlink of a secondary cell (SCell), and receiving a power headroom information for each activated cell from the terminal. A power headroom report (PHR) for the power headroom information is triggered if a prohibitPHR-Timer expires and a path loss is changed more than a threshold for at least one activated cell which is used as the path loss reference.

In accordance with still another aspect of the present invention, a base station for receiving power headroom information in a communication system is provided. The base station includes a transceiver configured to transmit and receive a signal, and a controller. The controller is configured to transmit information for a path loss reference to a user equipment (UE), wherein the information for the path loss reference indicates whether the UE applies as the path loss reference either a downlink of a primary cell or a downlink of a secondary cell (SCell), and receive a power headroom information for each activated cell from the terminal. A power headroom report (PHR) for the power headroom information is triggered if a prohibitPHR-Timer expires and a path loss is changed more than a threshold for at least one activated cell which is used as the path loss reference.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for reporting Power Headroom (PH) information for multiple uplink carriers efficiently in a mobile communication system supporting carrier aggregation.

For convenience in description, the exemplary embodiments of the present invention are described in the context of a mobile communication system described below with reference to FIGS. 1, 2, and 3. However, the present invention is not limited to the mobile communication system described herein and is equally applicable to other mobile communication systems.

Figure 1:
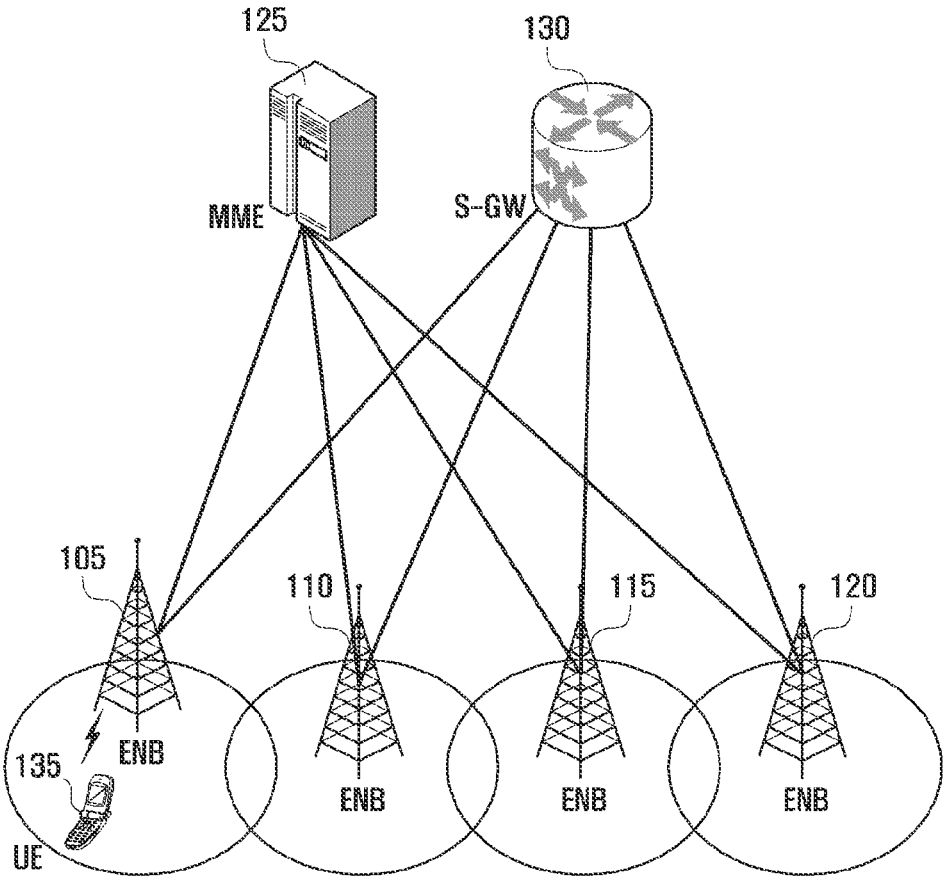
FIG. 1 is a diagram illustrating an architecture of a Long Term Evolution (LTE) mobile communication system according to an exemplary embodiment of the present invention.

FIG. 1 is a diagram illustrating an architecture of a Long Term Evolution (LTE) mobile communication system according to an exemplary embodiment of the present invention.

Referring to FIG. 1, the Radio Access Network (RAN) of the LTE mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

The eNBs 105, 110, 115, and 120 perform a similar function as legacy node Bs of a Universal Mobile Communications System (UMTS). However, as compared to the legacy node Bs, the eNBs 105, 110, 115, and 120 allow the UE to establish a radio link and are responsible for more complicated functions. In the LTE system, all the user traffic including real time services such as Voice over Internet Protocol (VoIP) are provided through a shared channel and thus there is a need for a device which is located in the eNB to schedule data based on the state information of the UEs. In order to implement a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate based on the channel conditions experienced by the UE. S-GW 130 is an entity to provide data bearers so as to establish and release data bearers under the control of the MME 125. MME 125 is responsible for various control functions and is connected to the plurality of eNBs 105, 110, 115, and 120.

Figure 2:
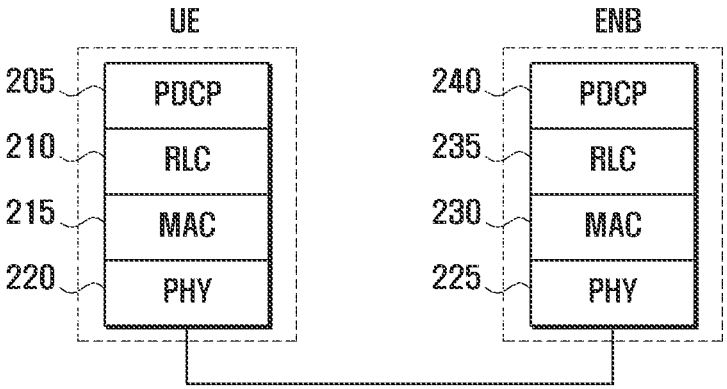
FIG. 2 is a diagram illustrating a protocol stack of a mobile communication system according to an exemplary embodiment of the present invention.

FIG. 2 is a diagram illustrating a protocol stack of a mobile communication system according to an exemplary embodiment of the present invention.

Referring to FIG. 2, the protocol stack of the LTE system includes Packet Data Convergence Protocol (PDCP) layer 205 and 240, Radio Link Control (RLC) layer 210 and 235, Medium Access Control (MAC) layer 215 and 230, and Physical (PHY) layer 220 and 225. The PDCP layer 205 and 240 is responsible for Internet Protocol (IP) header compression/decompression. The RLC 210 and 235 is responsible for segmenting a PDCP Protocol Data Unit (PDU) into segments of appropriate size for an Automatic Repeat Request (ARQ) operation. The MAC layer 215 and 230 is responsible for establishing a connection to a plurality of RLC entities so as to multiplex RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel or performs demodulating and channel-decoding on the received OFDM symbols and delivers the decoded data to a higher layer. In view of transmission, the data input to a protocol entity is referred to as Service Data Unit (SDU), and the data output by the protocol entity is referred to as the PDU.

Figure 3:
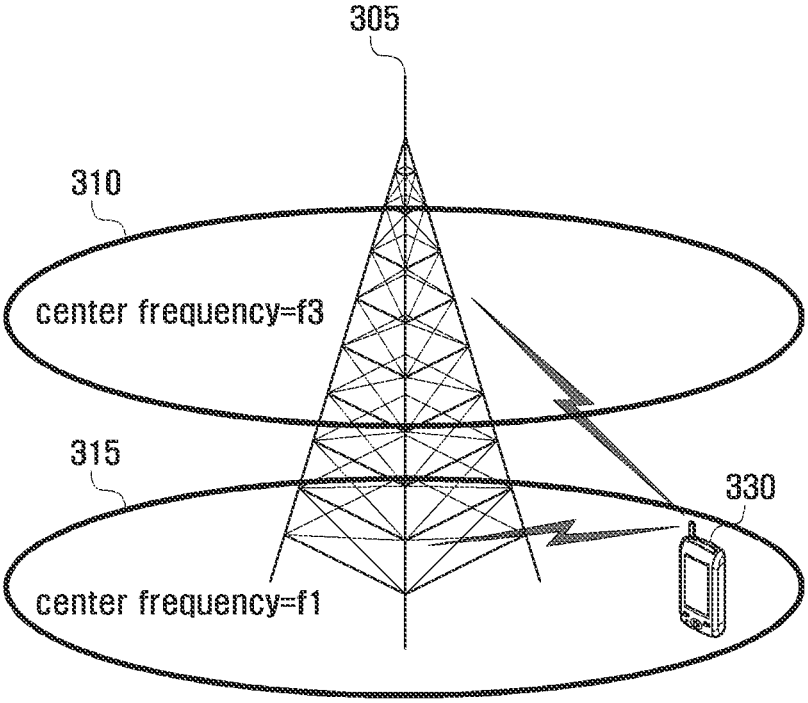
FIG. 3 is a diagram illustrating exemplary carrier aggregation in an LTE mobile communication system according to an exemplary embodiment of the present invention

A description is made of Carrier Aggregation (CA) with reference to FIG. 3.

FIG. 3 is a diagram illustrating exemplary carrier aggregation in an LTE mobile communication system according to an exemplary embodiment of the present invention.

Referring to FIG. 3, an eNB can use multiple carriers transmitted and received in different frequency bands. For example, the eNB 305 can be configured to use the carrier 315 with center frequency f1 and the carrier 310 with center frequency f3. If carrier aggregation is not supported, the UE 330 transmits/receives a data unit in one of the carriers 310 and 315. However, if carrier aggregation is supported, the UE 330 can transmit/receive data using both the carriers 310 and 315. The eNB can increase the amount of resources to be allocated to the UE 330 supporting carrier aggregation based on the channel conditions experienced by the UE 330 so as to improve the data rate of the UE 330.

In a case where a cell is configured with one downlink carrier and one uplink carrier, the carrier aggregation can be understood as if the UE communicates data via multiple cells. With the use of carrier aggregation, the maximum data rate increases in proportion to the number of aggregated carriers. The aggregated carriers are configured via Radio Resource Control (RRC) signaling. In LTE, it is possible to add or remove a carrier to or from the carrier aggregation using an RRCConnectionReconfiguration message. Although a specific carrier is configured, data transmission is not yet performed. In order to use the corresponding carrier, the carrier is activated by MAC signaling. In LTE, the configured carrier is activated by a MAC Control Element (CE) in a MAC PDU. Since the service is provided through the multiple activated carriers, multiple serving cells exist.

Meanwhile, in order to mitigate interference, the uplink transmission power should be maintained below an appropriate level. For this purpose, the UE calculates the uplink transmission power using a predetermined function and performs uplink transmission at the calculated uplink transmission power. For example, the UE calculates the required uplink transmission power value by inputting the input values such as the scheduling information including an amount of resources and a Modulation and Coding Scheme (MCS) allocated to the UE, and information used for estimating the channel condition such as a path loss, and performs uplink transmission by applying the calculated uplink transmission power value. The available uplink transmission power value of the UE is limited to the maximum transmission power value of the UE such that when the calculated transmission power value exceeds the maximum transmission power value the UE performs the uplink transmission at the maximum transmission power. In this case, the uplink transmission power is not enough, resulting in uplink transmission quality degradation. Accordingly, it is preferred that the eNB performs scheduling such that the required transmission power does not exceed the maximum transmission power. However, since a few parameters such as path loss cannot be determined by the eNB, the UE has to report its PH value to the eNB by means of a PH Report (PHR).

There are several factors influencing power headroom: 1) an amount of allocated transmission resources, 2) an MCS to be applied to uplink transmission, 3) a Path Loss (PL) of the related downlink carrier, and 4) an accumulated value of transmission power control command. Among them, the path loss and the accumulated transmission power control command value are variable according to the uplink carrier such that, when multiple uplink carriers are aggregated, it is preferred to configure the transmission of PHR per carrier. However, in order to transmit the PHR efficiently, it can be advantageous to report the PHs of all the uplink carriers on one uplink carrier. Depending on the management policy, it may be necessary to transmit the PH of the carrier on which no Physical Uplink Shared CHannel (PUSCH) transmission takes place. In this case, it can be more efficient to report the PHs of the multiple uplink carriers on a single uplink carrier. For this purpose, the PHR of the related art should be extended. The multiple PHs carried by a PHR can be arranged in a predetermined order.

Figure 4:
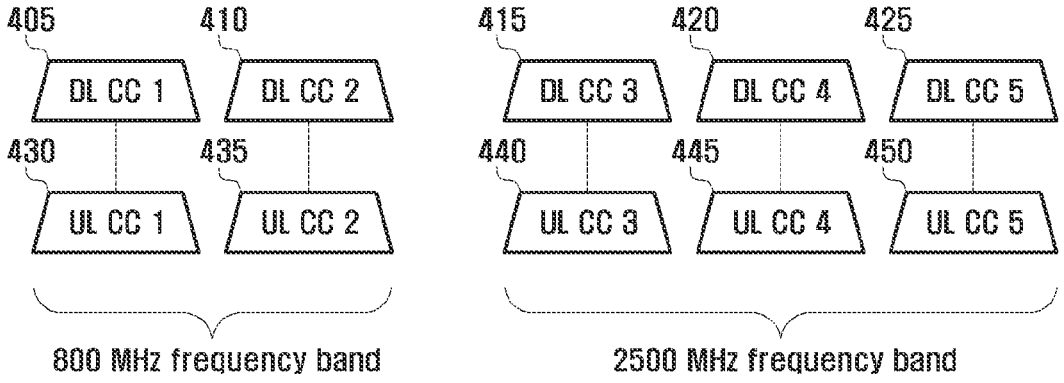
FIG. 4 is a diagram illustrating a principle of carrier aggregation in an LTE mobile communication according to an exemplary embodiment of the present invention.

FIG. 4 is a diagram illustrating a principle of carrier aggregation in an LTE mobile communication according to an exemplary embodiment of the present invention.

Referring to FIG. 4, five downlink carriers can be aggregated for the UE including downlink carrier 1 405, downlink carrier 2 410, downlink carrier 3 415, downlink carrier 4 420, and downlink carrier 5 425. Similarly, five uplink carriers can be aggregated for the UE including uplink carrier 1 430, uplink carrier 2 435, uplink carrier 3 440, uplink carrier 4 445, and uplink carrier 5 450. Here, one of the aggregated carriers can be selected to transmit the PHs for the 5 uplink carriers. For example, when three uplink carriers 440, 445, and 450 are aggregated for the UE, a PHR can be configured to carry the PHs for the three uplink carriers.

PHR is triggered when the path loss of the connected downlink carrier is equal to or greater than a predetermined threshold value, a prohibit PHR time expires, or a predetermined time period elapses after the PHR generation. Once a PHR has been triggered, the UE waits until the time for the uplink transmission arrives, e.g., the time for which the uplink transmission resource is allocated, rather than transmitting the PHR immediately. This is because PHR is not information that is very sensitive to delay. The UE transmits PHR at the first uplink transmission. A PHR is MAC layer control information and has the length of 8 bits. The first two bits of a PHR are reserved for future use, and the remaining 6 bits are used to indicate the value in the range between −23 dB and 40 dB as the PH of the UE. The UE calculates the PH using the following equation:

$$PH(i)=P_{CMAX,c}(i)-\{10\log_{10}(M_{PUSCH,c}(i))+P_{O_PUSCH,c}(j)+\alpha_c(j)\cdot PL_c+\Delta_{TF,c}(i)+f_c(i)\} \quad (1)$$

The PH(i) of the $i^{th}$ subframe in the serving cell c is calculated with the maximum uplink transmission power $P_{CMAX,c}(i)$, number of resource blocks $M_{PUSCH,c}(i)$, power offset derived from MCS $\Delta_{TF,c}$, Path Loss $PL_c$, and accumulated TPC commands $f_c(i)$. In equation (1), $PL_c$ denotes the pass loss of cell which provides information on the path loss in the service cell c. The path loss used to determine uplink transmission power of a certain serving cell is the path loss of the downlink channel of the corresponding cell or the path loss of a downlink channel of another cell. The cell of which path loss is to be used is selected by the eNB and notified to the UE in the call setup process. In equation (1), $f_c(i)$ is the accumulated value of the accumulated Transmission Power Control (TPC) commands of the serving cell c. $P_{O_PUSCH,C}$ denotes a higher layer parameter corresponding to the sum of cell-specific and UE-specific values. Typically, $P_{O_PUSCH,C}$ is set to a value determined depending on the transmission type of the PUSCH such as semi-persistent scheduling, dynamic scheduling, and a random access response. $\alpha_c$ denotes a 3-bit cell specific value provided from a higher layer as the weight applied to the path loss when calculating uplink transmission power (i.e., the higher this value is, the more the path loss influences the uplink transmission power), and its value is limited according to the transmission type of the PUSCH. j denotes the transmission type of the PUSCH. The parameter j is set to 0 for semi-persistent scheduling, 1 for dynamic scheduling, and 2 for random access response. If there is no PUSCH transmission, $M_{PUSCH}$ and $\Delta_{TF}$ are not applied to equation (1).

In the mobile communication system supporting carrier aggregation, there can be a serving cell in which no PUSCH transmission takes place and a serving cell in which PUSCH transmission takes place. Also, the PH for a serving cell can be reported in another serving cell. In the mobile communication system supporting carrier aggregation, when the PHs of multiple serving cells are to be reported, the UE can transmit the PHs in a single PHR. This method is advantageous in that it reduces the signaling overhead as compared to the method of transmitting the PHs individually, and the eNB can acquire the PH for the carrier on which no PUSCH is transmitted.

Figure 5:
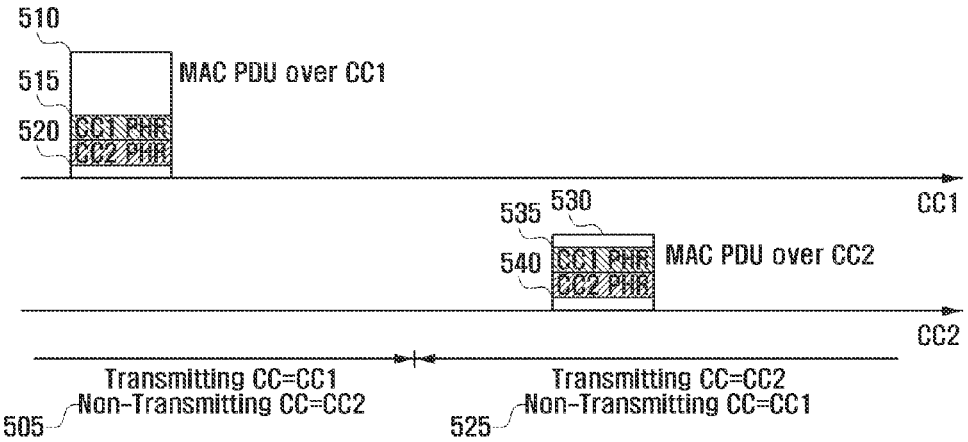
FIG. 5 is a diagram illustrating an exemplary scenario of Power Headroom (PH) reporting according to an exemplary embodiment of the present invention.

FIG. 5 is a diagram illustrating an exemplary scenario of PH reporting according to an exemplary embodiment of the present invention.

Referring to FIG. 5, the diagram shows a scenario in which each of two serving cells CC1 and CC2 transmits the PHs of both the serving cells. In the time duration 505 for which PUSCH transmission takes place in CC1 but not in CC2, the UE can transmit MAC PDU 510 containing the CC1 PH 515 and CC2 PH 520. Also, in the time duration 525 for which PUSCH transmission takes place in CC2 but not in CC1, the UE can transmit MAC PDU 530 containing the CC1 H 535 and CC2 PH 540.

Typically, PHR is triggered when the path loss on the downlink carrier associated with an uplink carrier becomes equal to or greater than a predetermined threshold value or a predetermined time period has elapsed after creating a PHR in a serving cell.

The eNB provides a UE with the parameters related to the PHR trigger operation. The parameters include periodicPHR-Timer, prohibitPHR-Timer, and dl-PathlossChange. The periodicPHR-Timer is a timer for triggering PHR periodically. In order to prevent PHR from being triggered too frequently, the prohibitPHR-Timer is used. Also, PHR is triggered when the path loss of the downlink carrier associated with an uplink carrier becomes equal to or greater than a predetermined threshold value, which is referred to as dl-PathlossChange. In the PHR procedure of the related art, the downlink carrier associated with an uplink carrier is determined and fixed to a specific one. This means that the path loss on the downlink carrier associated with the corresponding uplink carrier is also fixed. In the system supporting carrier aggregation, however, there can be multiple downlink carriers that can be associated with one uplink carrier. In particular, the downlink carrier of which path loss is referenced can be a downlink carrier of another serving cell other than the same serving cell. At this time, the eNB notifies the UE of the cell in which path loss is referenced for determining uplink transmission power through an RRC signaling message. In the present exemplary embodiment, the eNB notifies the UE of the serving cell of which downlink carrier's path loss is to be referenced for a PHR trigger through an RRC control message. The serving cell of which the downlink carrier's path loss is referenced for uplink transmission power configuration for a certain serving cell and the serving cell of which downlink carrier's path loss is to be referenced for determining a PHR trigger can be identical with each other. In this case, it is possible to inform of the two items of information simultaneously rather than separately. In a case where a plurality of serving cells is managed by an eNB, the eNB notifies the UE of the use of extended PHR (or REL-10 PHR) and other information.

Figure 6:
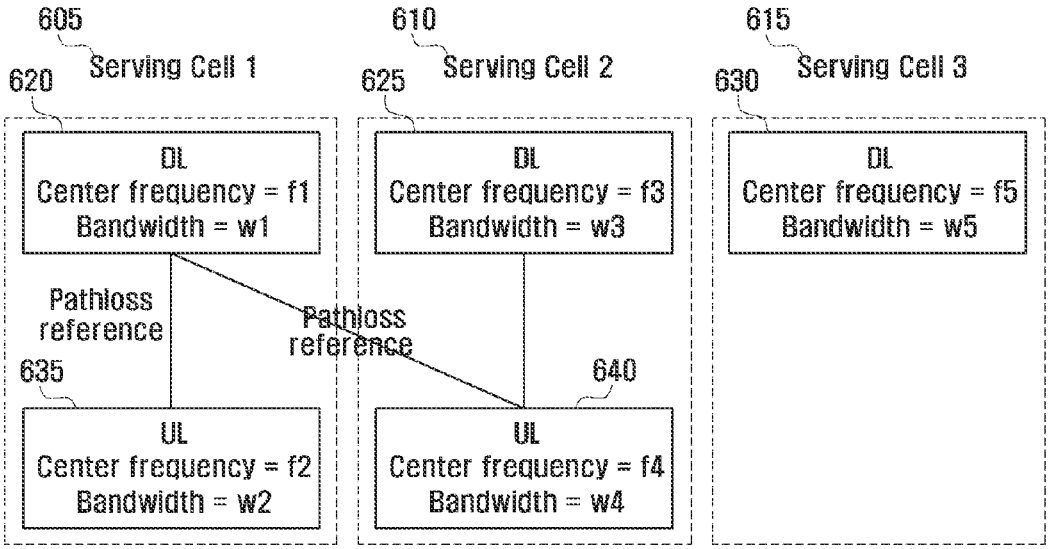
FIG. 6 is a diagram illustrating a principle of determining downlink carrier on which path loss is referenced according to an exemplary embodiment of the present invention.

FIG. 6 is a diagram illustrating a principle of determining downlink carrier on which path loss is referenced according to an exemplary embodiment of the present invention.

Referring to FIG. 6, reference numbers 605, 610, and 615 denote serving cells 1, 2, and 3. A downlink carrier 620 of the serving cell 605 is associated with an uplink subcarrier 635 of the serving cell 605 and an uplink subcarrier 640 of the serving cell 610. Also, a downlink carrier 625 of the serving cell 610 is associated with an uplink subcarrier 640 of the serving cell 610. Meanwhile, the serving cell 615 has a downlink carrier 630 but no uplink carrier. Reference numbers 635 and 640 denote uplink carriers. In an Secondary Cell (SCell) configuration process, the uplink carriers 635 and 640 are linked with the downlink carriers 620 and 625. If the service cell 605 is configured as a Primary Cell (PCell), the path loss of the downlink carrier 620 is referenced to determine whether to trigger PHR for the uplink carrier 635. If the path loss of a downlink carrier is referenced, this means that the path loss of the downlink carrier is used for configuring the uplink transmission power originally, but the meaning is expended for a PHR trigger. That is, if the displacement of the path loss is considered as a condition for a PHR trigger, this means that the path loss of the indicated downlink carrier's path loss is applied. In order to trigger a PHR for uplink carrier 640, the path loss of the downlink carrier 620 can be referenced in place of that of the downlink carrier 625. The reason why the path loss of a downlink carrier of other cell is used is because the received power can be strong enough on a downlink carrier but weak on another downlink carrier. Accordingly, by using the path loss of the downlink carrier having good received signal strength, it is possible to acquire more accurate displacement of the path loss. The eNB notifies the UE of the downlink carrier of which path loss is previously referenced. When configuring a SCell, the serving cell of which path loss is referenced for calculating uplink transmission power of the SCell is indicated in RadioResourceConfigDedicatedSCell as SCell configuration information. Accordingly, a serving cell can provide the path loss information or not. If a serving cell provides pass loss information for the same serving cell or other serving cell, the UE can determine whether to trigger PHR by referencing the displacement of the path loss of the corresponding serving cell. That is, the UE determines whether to trigger PHR based on the displacement of the path loss of the currently activated serving cell. In more detail, the UE triggers PHR when the path loss of one or more serving cells changes by as much as a predetermined amount than the path loss at the most recent PHR transmission. Accordingly, if a serving cell is configured with an uplink carrier but does not provide a path loss, the UE does not trigger a PHR in response to the displacement of the path loss of the downlink carrier of the corresponding serving cell. In the UE procedure according to an exemplary embodiment of the present invention, if REL-10 PHR is configured with the SCell configuration and if a new uplink transmission takes place, the UE reports PHs for all of the activated serving cells that are configured with uplink carriers. This is to report the initial state after SCell configuration. In order to use to determine whether to trigger PHR afterward, the UE saves the path loss values of the downlink carriers. The UE monitors to determine whether the displacement of the path loss of the serving that is referenced for estimating the path loss of each uplink carrier exceeds dl-pathlosschange. If the path loss displacement is greater than dl-PathlossChange on at least one uplink carrier and if the prohibitPHR-Timer expires or has expired, the UE triggers PHR immediately for all of the activated serving calls configured with uplink carriers.

Figure 7:
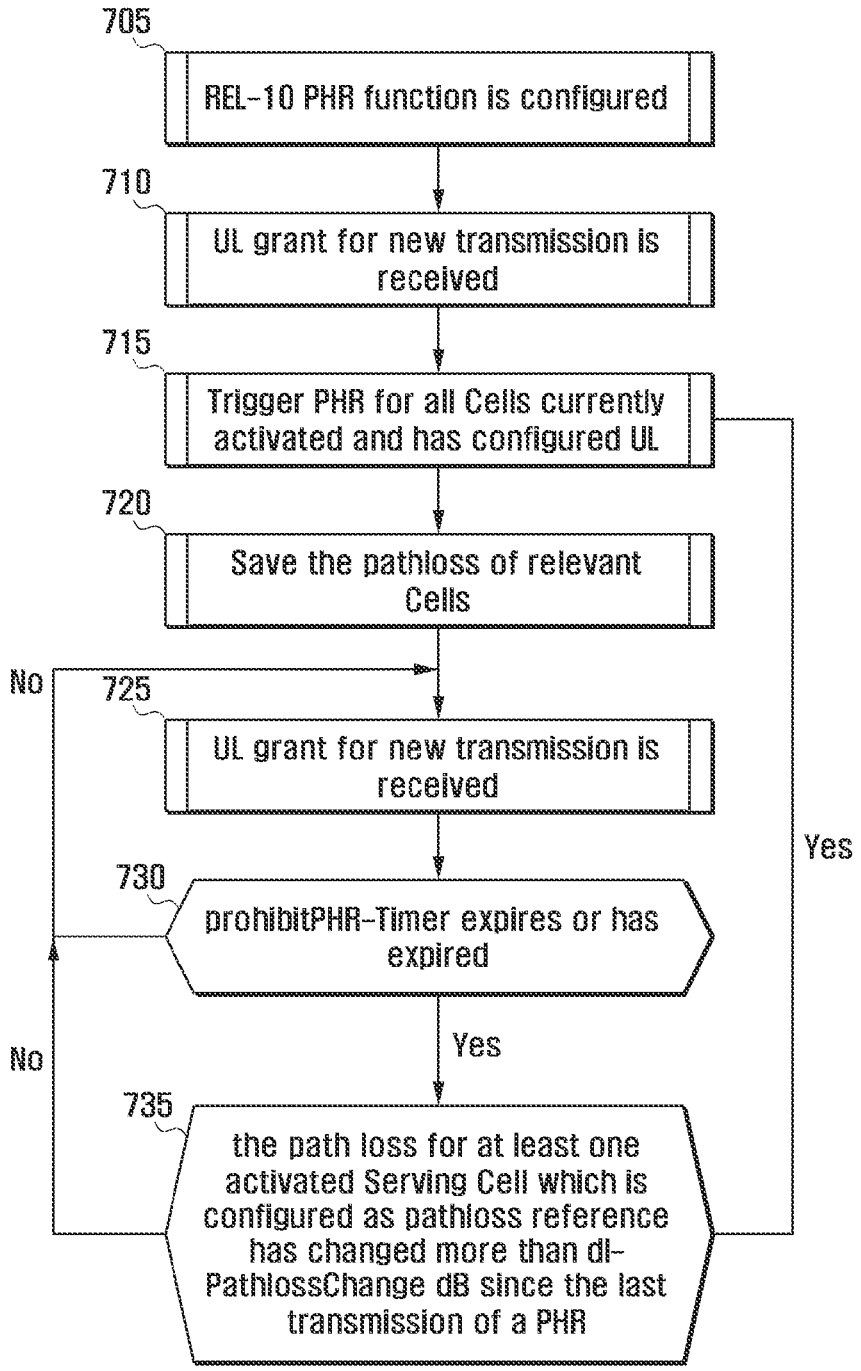
FIG. 7 is a flowchart illustrating a power headroom report method according to an exemplary embodiment of the present invention.

FIG. 7 is a flowchart illustrating a power headroom report method according to an exemplary embodiment of the present invention.

Referring to FIG. 7, the UE first configures an SCell along with a REL-10 PHR configuration in step 705. In a case where an eNB manages multiple serving cells, the extended PHR is used always. If an uplink grant for a new transmission is received in step 710 after the REL-10 PHR configuration, the UE triggers PHR for all activated service cells configured with uplink carriers in step 715. In order to determine whether to trigger PHR afterward, the UE saves the path losses of reference downlink carriers in step 720. Afterward, if an uplink grant for a new transmission is received in step 725, the UE determines whether prohibitPHR-Timer expires or has expired in step 730. If prohibitPHR-Timer has not expired, this means that PHR is prohibited, and thus the UE returns to step 725 and waits until a next uplink grant for a new transmission is received. If the prohibitPHR-Timer expires or has expired, the UE, in step 735, determines whether the path loss change on at least one downlink carrier associated, for path loss reference, with the uplink carrier is larger than dl-PathlossChange. If not, the UE returns to step 725 and waits until a next uplink grant for a new transmission is received. If so, the UE triggers PHR for all activated serving cells configured with uplink carriers.

If PHR is triggered, the UE calculates PHs for individual uplink carriers and configures an extended PHR. Even when there is no real PUSCH transmission, the eNB can trigger PHR to acquire path loss information on a specific uplink carrier. If PHR is triggered for a specific serving cell, the UE determines a PH calculation scheme depending on whether PUSCH is transmitted. If there is a PUSCH transmission in the corresponding serving cell, the UE calculates a PH according to the method of the related art using equation (1). If there is no PUSCH transmission in the serving cell, this means no transmission resource is allocated such that it is not clear to determine the values of $M_{PUSCH}$ and $\Delta_{TF}$ and, as a consequence, a device allowing for the eNB and UE to calculate and interpret the PH using the same $M_{PUSCH}$ and $\Delta_{TF}$. This can be addressed with a fixed transmission format (e.g., a transmission resource amount and MCS level) for use in PH calculation in a case of no PUSCH transmission, the transmission format being agreed upon between the UE and the eNB. Assuming that the reference transmission format is a combination of 1 Resource Block (RB) and a lowest MCS level, both the $M_{PUSCH}$ and $\Delta_{TF}$ are set to 0 and this is the same as omitting these parameters in equation (1). That is, since there is no real data transmission in the corresponding serving cell, no $P_{CMAX,c}(i)$ exists. Accordingly, the value of $P_{CMAX,c}(i)$ should be determined. For such a virtual transmission, virtual $P_{CMAX,c}(i)$ is defined and adopted. $P_{CMAX,c}(i)$ can be determined using the maximum allowed UE output power $P_{EMAX}$ and nominal UE power $P_{PowerClass}$. For example, $P_{CMAX,c}(i)$ can be determined as equation (2):

$$P_{CMAX,c}=\min\{P_{EMAX},P_{PowerClass}\} \tag{2}$$

$P_{CMAX}$ has the relationship of $P_{CMAX_L}\leq P_{CMAX}\leq P_{PowerClass}$. Here, if zero power back-off is considered, $P_{CMAX_L}=P_{CMAX_H}$ and thus $P_{CMAX}=P_{CMAX_H}$. At this time, $P_{CMAX}$ is the least one of $P_{PowerClass}$ and $P_{EMAX}$. $P_{EMAX}$ is the cell-specific maximum allowed UE transmission power, and $P_{PowerClass}$ is the UE-specific maximum allowed power.

Accordingly, when there is no PUSCH transmission in the corresponding serving cell, PH is defined as equation (3):

$$PH(i)=\min\{P_{EMAX},P_{PowerClass}\}-\{P_{O_PUSCH,c}(j)+\alpha_c(j)\cdot PL_c+f_c(i)\} \tag{3}$$

where $P_{O_PUSCH,C}$, $\alpha_c$, $f_c(i)$, and $PL_c$ are set to the values of the serving cell for which PH is calculated for other than the serving cell in which PH is transmitted. The PH calculated by equation (3) is reported to the eNB along with other PHs in the PHR transmitted in other serving cell. The eNB can determine the PHs for individual serving cells with only one PHR. However, there is a problem in that the eNB does not know whether the individual serving cells' PHs carried in the PHR are calculated based on the real PUSCH transmissions or a PUSCH reference format. Without this information, it is not possible for the eNB to interpret the PHs correctly, resulting in inefficient scheduling. In order to address this problem, an indicator should be provided for indicating whether each PH is calculated based on the real PUSCH transmission or the PUSCH reference format in the PHR format of the related art. Accordingly, a calculation type indicator is included. The calculation type indicator can be configured with 1 bit. When reporting a PH for a certain cell, the UE sets the one-bit calculation type indicator to a predetermined value (e.g., 0) to indicate that the PH is calculated by applying a real transmission format or another value (e.g., 1) to indicate that the PH is calculated by applying the reference format (i.e., RB=0 and $\Delta_{TF}=0$) because of no PUSCH transmission in the corresponding cell.

Figure 8:
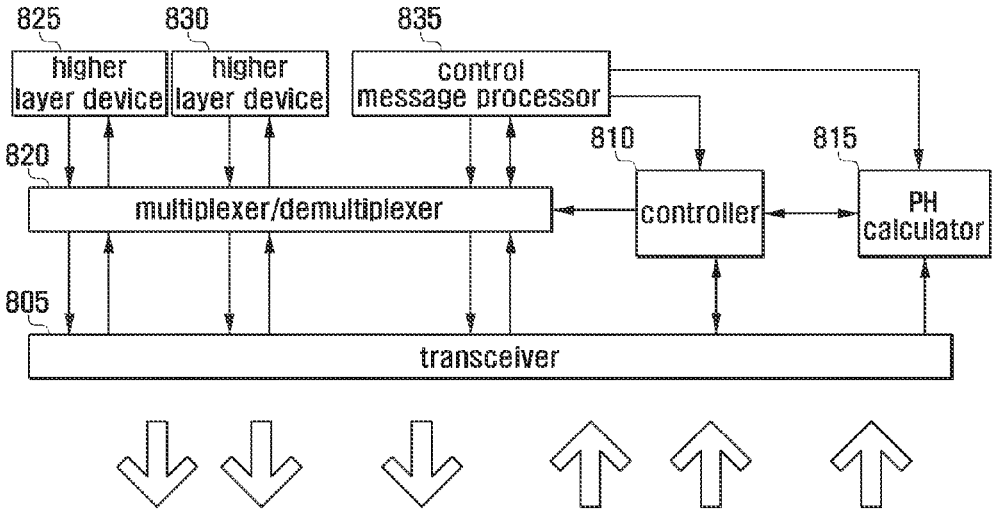
FIG. 8 is a block diagram illustrating a configuration of a User Equipment (UE) according to an exemplary embodiment of the present invention.

FIG. 8 is a block diagram illustrating a configuration of a UE according to an exemplary embodiment of the present invention.

Referring to FIG. 8, the UE includes a transceiver 805, a PH calculator 815, a controller 810, a multiplexer/demultiplexer 820, a control message processor 835, and various higher layer devices 825 and 830.

The transceiver 805 receives data and control signals on the downlink carriers and transmits data and control signals on the uplink carriers. In a case where a plurality of carriers is aggregated, the transceiver 805 can transmit/receive the data and control signals over a plurality of carriers.

The controller 810 controls the multiplexer/demultiplexer 820 to generate MAC PDUs according to the control signal received by means of the transceiver 805, e.g., the scheduling information in the uplink grant. The controller detects the PHR trigger. If a PHR trigger is detected, the controller 810 controls the PH calculator 815 to calculate the PH. Whether PHR is triggered can be determined by checking the PHR parameter provided by the control message processor 835. In a case where the PHs of multiple uplink carriers are configured into a PHR, the controller 810 controls the multiplexer/demultiplexer 820 to insert into the MAC PDU an indicator indicating whether the PH for each carrier is derived from a real $P_{CMAX}$ or a virtual $P_{CMAX}$. The controller 810 generates the PHR with the PHs provided by the PH calculator 815 and sends the PHR to the multiplexer/demultiplexer 820. The PH calculator 815 calculates PH according to the control signal from the controller 810 and sends the PH to the controller 810. In a case where a plurality of carriers is aggregated, the PH calculator 815 can calculate PHs for the respective carriers, and especially the PH for the carrier having the PUSCH transmission being calculated using a virtual $P_{CMAX}$.

The multiplexer/demultiplexer 820 multiplexes the data from the higher layer devices 825 and 830 and/or control message processor 835 and demultiplexes the data received by the transceiver 805 to the higher layer devices 825 and 830 and/or the control message processor 835.

The control message processor 835 processes the control message transmitted by the network and performs a corresponding action. The control message processor 835 forwards the PHR parameter carried in the control message to the controller 810 or the information on the newly activated carriers to the transceiver 805 to set the carriers. The higher layer devices 825 and 830 can be implemented for the respective services so as to deliver the data generated by the user service such as File Transfer Protocol (FTP) and VoIP to the multiplexer/demultiplexer 820 or process and deliver the data from the multiplexer/demultiplexer 820 to the service applications of the higher layer.

Although not depicted, the base station apparatus of an exemplary embodiment of the present invention can include a transceiver, a controller, and a scheduler. The transceiver receives the extended PHR transmitted by the UE. The controller analyzes the extended PHR to determine PH per serving cell. The scheduler allocates uplink resources according to the PH per serving cell.

As described above, the PHR method and apparatus of exemplary embodiments of the present invention are capable of reporting PHs for multiple carriers efficiently in the mobile communication supporting carrier aggregation. The power headroom report method and apparatus of the present invention is capable of improving PH reporting efficiency in the mobile communication system supporting carrier aggregation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

[1. A method for obtaining, by a user equipment (UE), power headroom information in a communication system, the method comprising:

acquiring information for a path loss reference, wherein the information for the path loss reference indicates whether the UE applies as the path loss reference either a downlink of a primary cell or a downlink of a secondary cell (SCell);

triggering a power headroom report (PHR) if a prohibitPHR-Timer expires and a path loss is changed more than a threshold for at least one activated cell which is used as the path loss reference; and obtaining power headroom information for each activated cell, if extended PHR is used and an uplink resource is allocated for new transmission.]

[2. The method of claim 1, wherein the downlink of the secondary cell corresponding to an uplink is indicated by adding the SCell.]

[3. The method of claim 1, wherein the power headroom information for each activated cell is multiplexed with a higher layer data.]

[4. The method of claim 1, further comprising:

generating a media access control (MAC) protocol data unit (PDU) including the power headroom information for each activated cell and an indicator for maximum transmit power information.]

[5. The method of claim 4, wherein if the indicator is 0 the indicator indicates the first type maximum transmit power information, and wherein if the indicator is 1 the indicator indicates the second type maximum transmit power information.]

[6. A user equipment (UE) for obtaining power headroom information in a communication system, the UE comprising:

a transceiver configured to transmit and receive a signal; and a controller configured to:

acquire information for a path loss reference, wherein the information for the path loss reference indicates whether the UE applies as the path loss reference either a downlink of a primary cell or a downlink of a secondary cell (SCell), trigger a power headroom report (PHR) if a prohibitPHR-Timer expires and a path loss is changed more than a threshold for at least one activated cell which is used as the path loss reference, and obtain power headroom information for each activated cell, if extended PHR is used and an uplink resource is allocated for new transmission.]

[7. The UE of claim 6, wherein the downlink of the secondary cell corresponding to an uplink is indicated by adding the SCell.]

[8. The UE of claim 6, wherein the power headroom information for each activated cell is multiplexed with a higher layer data.]

[9. The UE of claim 6, wherein the controller is further configured to generate a media access control (MAC) protocol data unit (PDU) including the power headroom information for each activated cell and an indicator for maximum transmit power information.]

[10. The UE of claim 9, wherein if the indicator is 0 the indicator indicates the first type maximum transmit power information, and wherein if the indicator is 1 the indicator indicates the second type maximum transmit power information.]

[11. A method for receiving power headroom information by a base station in a communication system, the method comprising:

transmitting information for a path loss reference to a user equipment (UE), wherein the information for the path loss reference indicates whether the UE applies as the path loss reference either a downlink of a primary cell or a downlink of a secondary cell (SCell); and receiving a power headroom information for each activated cell from the terminal, wherein a power headroom report (PHR) for the power headroom information is triggered if a prohibitPHR-Timer expires and a path loss is changed more than a threshold for at least one activated cell which is used as the path loss reference.]

[12. The method of claim 11, wherein the downlink of the secondary cell corresponding to an uplink is indicated by adding the SCell.]

[13. The method of claim 11, wherein the power headroom information for each activated cell is multiplexed with a higher layer data.]

[14. The method of claim 11, further comprising:

receiving a media access control (MAC) protocol data unit (PDU) including the power headroom information for each activated cell and an indicator for maximum transmit power information.]

[15. The method of claim 14, wherein if the indicator is 0 the indicator indicates the first type maximum transmit power information, and wherein if the indicator is 1 the indicator indicates the second type maximum transmit power information.]

[16. A base station for receiving power headroom information in a communication system, the base station comprising:

a transceiver configured to transmit and receive a signal; and a controller configured to:

transmit information for a path loss reference to a user equipment (UE), wherein the information for the path loss reference indicates whether the UE applies as the path loss reference either a downlink of a primary cell or a downlink of a secondary cell (SCell), and receive a power headroom information for each activated cell from the terminal, wherein a power headroom report (PHR) for the power headroom information is triggered if a prohibitPHR-Timer expires and a path loss is changed more than a threshold for at least one activated cell which is used as the path loss reference.]

[17. The base station of claim 16, wherein the downlink of the secondary cell corresponding to an uplink is indicated by adding the SCell.]

[18. The base station of claim 16, wherein the power headroom information for each activated cell is multiplexed with a higher layer data.]

[19. The base station of claim 16, wherein the controller is further configured to receive a media access control (MAC) protocol data unit (PDU) including the power headroom information for each activated cell and an indicator for maximum transmit power information.]

[20. The base station of claim 19, wherein if the indicator is 0 the indicator indicates the first type maximum transmit power information, and wherein if the indicator is 1 the indicator indicates the second type maximum transmit power information.]

*21. A method for obtaining, by a user equipment (UE), power headroom information in a communication system, the method comprising:*

*acquiring information for a power headroom report (PHR) associated with a multiple cells;*

*acquiring information for a path loss reference based on a second cell configuration, wherein the information for the path loss reference indicates a cell which the UE applies as the path loss reference;*

*triggering the PHR in case that a prohibitPHR-Timer expires and a path loss is changed more than a threshold for at least one activated cell which is used as the path loss reference;*

*obtaining power headroom information for each activated cell configured with uplink (UL), in case that an uplink resource is allocated for new transmission; and*

*generating a medium access control (MAC) protocol data unit (PDU) including the power headroom information for each activated cell with configured UL and an indicator for each activated cell with configured UL,*

*wherein the indicator indicates whether the power headroom information is based on a real physical uplink shared channel (PUSCH) transmission or a PUSCH reference format,*

*wherein, in a case that the power headroom information is based on the real PUSCH transmission, the power headroom information is obtained based on a parameter related to a number of resource blocks and a parameter derived from modulation and coding scheme (MCS), and*

*wherein, in case that power headroom information is based on the PUSCH reference format, the parameter related to the number of resource blocks and the parameter derived from MCS are set to 0, zero power back-off is considered and the power headroom is obtained based on a maximum uplink transmission power equal to one of a maximum allowed UE output power ($P_{EMAX}$) and a nominal UE power ($P_{powerclass}$).*

*22. The method of claim 21, wherein a path loss reference for a first cell is the first cell and a downlink of the second cell corresponding to an UL of the second cell is indicated by adding the second cell.*

*23. The method of claim 21, wherein the power headroom information for each activated cell with configured UL is multiplexed with higher layer data.*

*24. The method of claim 21,*

*wherein in case that the indicator is 0 the indicator indicates the real PUSCH transmission, and*

*wherein in case that the indicator is 1 the indicator indicates the PUSCH reference format.*

*25. A method performed by a base station for power headroom information in a communication system, the method comprising:*

*transmitting, to a user equipment (UE), information for a power headroom report (PHR) associated with multiple cells and information for a path loss reference based on a second cell configuration, wherein the information for the path loss reference indicates a cell which the UE applies as the path loss reference; and*

*receiving, from the UE, a medium access control (MAC) protocol data unit (PDU) including power headroom information for each activated cell with configured uplink (UL) and an indicator for each activated cell with configured UL,*

*wherein the indicator indicates whether the power headroom information is based on a real physical uplink shared channel (PUSCH) transmission or a PUSCH reference format,*

*wherein, in a case that the power headroom information is based on the real PUSCH transmission, the power headroom information is obtained based on a parameter related to a number of resource blocks and a parameter derived from modulation and coding scheme (MCS), and*

*wherein, in a case that power headroom information is based on the PUSCH reference format, the parameter related to the number of resource blocks and the parameter derived from MCS are set to 0, zero power back-off is considered and the power headroom is obtained based on a maximum uplink transmission power equal to one of a maximum allowed UE output power ($P_{EMAX}$) and a nominal UE power ($P_{powerclass}$).*

*26. The method of claim 25,*

*wherein, a path loss reference for a first cell is the first cell and a downlink of the second cell corresponding to an UL of the second cell is indicated by adding the second cell,*

*wherein the PHR is triggered by the UE, in case that a prohibitPHR-Timer expires and a path loss is changed more than a threshold for at least one activated cell which is used as the path loss reference, and*

*wherein the power headroom information for at least one activated cell configured with UL is obtained by the UE, in case that an uplink resource is allocated for new transmission and the PHR for the multiple cells is configured.*

*27. The method of claim 25,*

*wherein the power headroom information for each activated cell with configured UL is multiplexed with a higher layer data.*

*28. The method of claim 25,*

*wherein in case that the indicator is 0 the indicator indicates the real PUSCH transmission, and*

*wherein in case that the indicator is 1 the indicator indicates the PUSCH reference format.*

*29. A user equipment (UE) for power headroom information in a communication system, the UE comprising:*

*a transceiver; and*

*a controller configured to:*

*acquire information for a power headroom report (PHR) associated with multiple cells,*

*acquire, via the transceiver, information for a path loss reference based on a second cell configuration, wherein the information for the path loss reference indicates a cell which the UE applies as the path loss reference, and*

*trigger the PHR in case that a prohibitPHR-Timer expires and a path loss is changed more than a threshold for at least one activated cell which is used as the path loss reference,*

*obtain power headroom information for each activated cell configured with uplink (UL), in case that an uplink resource is allocated for new transmission, and*

*generate a medium access control (MAC) protocol data unit (PDU) including the power headroom information for each activated cell with configured UL and an indicator for each activated cell with configured UL,*

*wherein the indicator indicates whether the power headroom information is based on a real physical uplink shared channel (PUSCH) transmission or a PUSCH reference format,*

*wherein, in a case that the power headroom information is based on the real PUSCH transmission, the power headroom information is obtained based on a parameter related to a number of resource blocks and a parameter derived from modulation and coding scheme (MCS), and*

*wherein, in case that power headroom information is based on the PUSCH reference format, the parameter related to the number of resource blocks and the parameter derived from MCS are set to 0, zero power back-off is considered and the power headroom is obtained based on a maximum uplink transmission power equal to one of a maximum allowed UE output power ($P_{EMAX}$) and a nominal UE power ($P_{powerclass}$).*

*30. The UE of claim 29,*

*wherein a path loss reference for a first cell is the first cell and a downlink of the second cell corresponding to an UL of the second cell is indicated by adding the second cell.*

*31. The UE of claim 29,*

*wherein the power headroom information for each activated cell with configured UL is multiplexed with a higher layer data.*

*32. The UE of claim 29,*

*wherein in case that the indicator is 0 the indicator indicates the real PUSCH transmission, and*

*wherein in case that the indicator is 1 the indicator indicates the PUSCH reference format.*

*33. A base station for power headroom information in a communication system, the base station comprising:*

*a transceiver; and*

*a controller configured to:*

*transmit, to a user equipment (UE) via the transceiver, information for a power headroom report (PHR) associated with multiple cells and information for a path loss reference based on a second cell configuration wherein the information for the path loss reference indicates a cell which the UE applies as the path loss reference, and*

*receive, from the UE via the transceiver, a medium access control (MAC) protocol data unit PDU including power headroom information for each activated cell with configured uplink (UL) and an indicator for each activated cell with configured UL,*

*wherein the indicator indicates whether the power headroom information is based on a real physical uplink shared channel (PUSCH) transmission or a PUSCH reference format,*

*wherein, in a case that the power headroom information is based on the real PUSCH transmission, the power headroom information is obtained based on a parameter related to a number of resource blocks and a parameter derived from modulation and coding scheme (MCS), and*

*wherein, in case that power headroom information is based on the PUSCH reference format, the parameter related to the number of resource blocks and the parameter derived from MCS are set to 0, zero power back-off is considered and the power headroom is obtained based on a maximum uplink transmission power equal to one of a maximum allowed UE output power ($P_{EMAX}$) and a nominal UE power ($P_{powerclass}$).*

*34. The base station of claim 33,*

*wherein a path loss reference for a first cell is the first cell and a downlink of the second cell corresponding to an UL of the second cell is indicated by adding the second cell,*

*wherein the PHR is triggered by the UE, in case that a prohibitPHR-Timer expires and a path loss is changed more than a threshold for at least one activated cell which is used as the path loss reference, and*

*wherein the power headroom information for at least one activated cell configured with UL is obtained by the UE, in case that an uplink resource is allocated for new transmission and the PHR for the multiple cells is configured.*

*35. The base station of claim 33,*

*wherein the power headroom information for each activated cell with configured UL is multiplexed with higher layer data.*

*36. The base station of claim 33,*

*wherein in case that the indicator is 0 the indicator indicates the real PUSCH transmission, and*

*wherein in case that the indicator is 1 the indicator indicates the PUSCH reference format.*

* * * * *